United States Patent
Burdeniuc et al.

(10) Patent No.: US 8,367,870 B2
(45) Date of Patent: Feb. 5, 2013

(54) AUTOCATALYTIC POLYOLS

(75) Inventors: Juan Jesus Burdeniuc, Colmar, PA (US); Gamini Ananda Vedage, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 622 days.

(21) Appl. No.: 12/207,745

(22) Filed: Sep. 10, 2008

(65) Prior Publication Data

US 2009/0227695 A1   Sep. 10, 2009

Related U.S. Application Data

(60) Provisional application No. 60/973,459, filed on Sep. 19, 2007.

(51) Int. Cl.
  C07C 213/00 (2006.01)
  C07C 217/00 (2006.01)
  C08G 18/00 (2006.01)

(52) U.S. Cl. ........ 564/505; 521/155; 521/163; 521/164; 521/170; 521/174; 528/78

(58) Field of Classification Search .................. 521/170, 521/174, 155, 163, 164; 528/78; 564/505
  See application file for complete search history.

(56) References Cited

U.S. PATENT DOCUMENTS

| | | | |
|---|---|---|---|
| 4,230,824 A * | 10/1980 | Nodelman | 521/167 |
| 4,536,298 A | 8/1985 | Kamei et al. | |
| 4,737,576 A | 4/1988 | Bachem et al. | |
| 4,877,879 A | 10/1989 | Gansow | |
| 5,010,187 A | 4/1991 | Heuvelsland | |
| 5,034,425 A * | 7/1991 | Kuroishi et al. | 521/131 |
| 5,070,125 A | 12/1991 | Heuvelsland | |
| 5,114,619 A | 5/1992 | Heuvelsland | |
| 5,470,813 A | 11/1995 | Le-Khac | |
| 5,476,969 A | 12/1995 | Hinz | |
| 5,514,619 A | 5/1996 | Wakabayashi | |
| 5,589,431 A | 12/1996 | Le-Khac | |
| 6,008,263 A | 12/1999 | Thompson et al. | |
| 6,762,274 B2 | 7/2004 | Waddington | |
| 2006/0258832 A1 | 11/2006 | Bleuel et al. | |
| 2008/0194776 A1 | 8/2008 | Walker | |

FOREIGN PATENT DOCUMENTS

| | | |
|---|---|---|
| EP | 1 252 216 B1 | 7/2003 |
| EP | 1 985 644 A1 | 10/2008 |
| JP | 62-232426 A | 10/1987 |
| JP | 02-284912 A | 11/1990 |
| JP | 04-073271 A | 3/1992 |
| JP | 04-202428 A | 7/1992 |

(Continued)

OTHER PUBLICATIONS

U.S. Appl. No. 11/740,307, filed Apr. 26, 2007 Inventor: Vedage, Gamini.

(Continued)

*Primary Examiner* — Mark Eashoo
*Assistant Examiner* — Melissa Rioja
(74) *Attorney, Agent, or Firm* — Michael K. Boyer

(57) ABSTRACT

The present invention provides polymeric polyol compositions employing polyol compounds having multiple tertiary amine groups. Methods of making these compositions are also disclosed. Polyol formulations containing these polymeric polyol compositions and methods of making polyurethane gel and foam employing such polymeric polyol compositions are also provided.

28 Claims, 1 Drawing Sheet

FOREIGN PATENT DOCUMENTS

| | | |
|---|---|---|
| KR | 10-2004-0045040 A | 5/2004 |
| WO | 01/48048 A1 | 7/2001 |
| WO | 01/58976 A1 | 8/2001 |
| WO | 03/016372 A1 | 2/2003 |
| WO | 03/055930 A1 | 7/2003 |
| WO | 2004/060956 A1 | 7/2004 |

OTHER PUBLICATIONS

Takahashi, T.; "Chemical Modification of Poly(Ethyleneimine) for Polymeric Electrolyte"; Solid State Ionics; vol. 18-19; 1986; pp. 321-325.

* cited by examiner

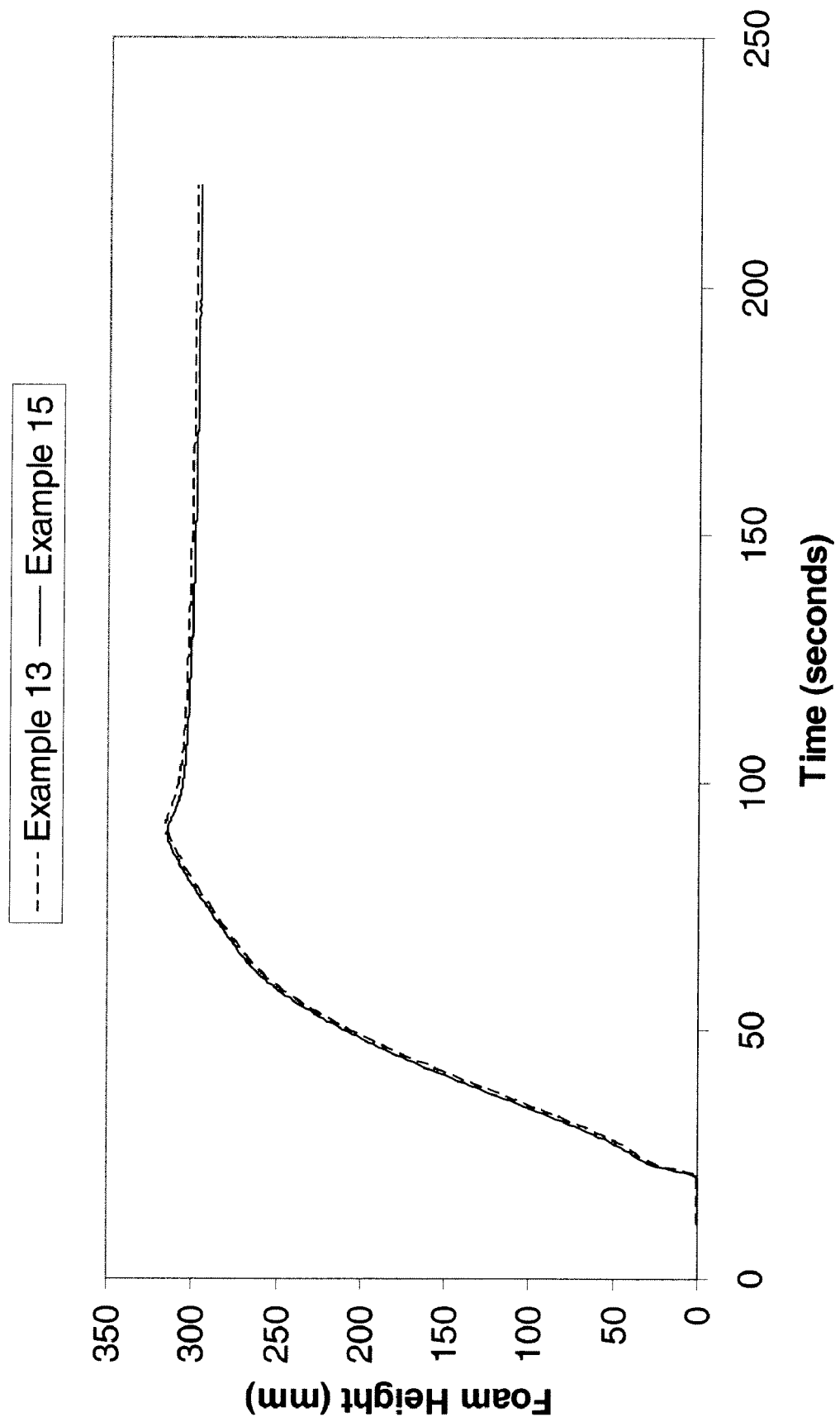

AUTOCATALYTIC POLYOLS

CROSS-REFERENCE TO RELATED APPLICATIONS

This application claims the benefit of U.S. Provisional Application No. 60/973,459, filed on Sep. 19, 2007, the disclosure of which is incorporated herein by reference in its entirety.

BACKGROUND OF THE INVENTION

The present invention relates generally to polymeric polyol compositions and methods of making such compositions. Further, the present invention relates to polyol formulations containing these polymeric polyol compositions and methods of making polyurethane gel and foam employing such polymeric polyol compositions.

Generally, polyols can be used with polyisocyanates and catalysts and/or other additives to form polyurethanes and polyurethane foams for a wide variety of commercial applications. Often, amine-based catalysts are used in the production of polyurethane foam. It can be beneficial to limit the volatility of this amine component or to lessen the amount of its use in a polyurethane formulation. In addition to reducing volatile organic compounds (VOC's), lessening volatility or reducing the level of amine use can reduce worker exposure, improve safety, and address quality concerns.

Compounds with tertiary amine groups are known to be useful catalysts for urethane reactions. Certain polyols, such as an autocatalytic polyols, contain tertiary amine groups which can reduce or eliminate the need for typical tertiary amine catalysts in formulations for polyurethanes. The reactivity of the urethane reaction system can be maintained at a reduced level of tertiary amine catalyst. Further, the presence of multiple tertiary amine groups in an autocatalytic polyol compound allows it to be chemically bound during a polyurethane gel or foam crosslinking reaction, for example. The resultant product can be substantially free of volatile amine emissions.

Thus, for urethane applications, it is desirable to produce polyol compounds or compositions having multiple tertiary amine groups to reduce, or eliminate, both the amount of tertiary amine catalyst used and the volatile amine emissions. Accordingly, it is to these ends that the polymeric polyol compositions of the present invention are directed.

BRIEF SUMMARY OF THE INVENTION

The present invention discloses polymeric polyol compositions comprising polyol compounds, and methods of making such compositions. These polymeric polyol compositions generally have a weight-average molecular weight (Mw) from about 400 to about 20,000. Such polymeric polyol compositions can act as autocatalytic polyols in polyurethane gel and foam applications.

Polymeric polyol compositions in accordance with the present invention comprise a reaction product of:

(a) a polymeric amine composition comprising amine compounds having the formula:

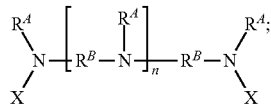

wherein:
each $R^A$ independently is a $C_1$-$C_6$ linear or branched alkyl;
each $R^B$ independently is a $C_3$-$C_6$ linear or branched alkanediyl;
each X independently is a hydrogen atom or $R^C$—$NH_2$;
$R^C$ is a $C_3$-$C_6$ linear or branched alkanediyl;
n is an integer in a range from 0 to 10; and
the polymeric amine composition has a number-average molecular weight (Mn) from about 250 to about 1500; and (b) at least one epoxide compound having the formula:

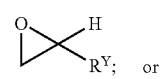

at least one glycidyl ether compound having the formula:

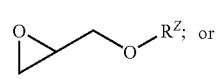

a combination thereof;
wherein:
$R^Y$ is hydrogen, phenyl, cyclohexyl, or a $C_1$-$C_{18}$ linear or branched alkyl;
$R^Z$ is hydrogen, phenyl, a $C_1$-$C_6$ linear or branched alkyl-substituted phenyl, or a $C_1$-$C_{18}$ linear or branched alkyl.

In another aspect of the present invention, a polyol formulation comprises a contact product of:
(i) a polymeric polyol composition and
(ii) at least one second polyol, wherein the at least one second polyol is at least one polyether polyol, at least one polyester polyol, or at least one polymer polyol, or any combination thereof.

Yet, in another aspect, the present invention provides for a composition comprising a contact product of:
(i) at least one polyisocyanate and
(ii) a polyol formulation comprising a polymeric polyol composition. In this aspect, the composition can further comprise at least one urethane catalyst and/or at least one additive. The polyol formulation can further comprise at least one second polyol in addition to the polymeric polyol composition. The at least one second polyol can be at least one polyether polyol, at least one polyester polyol, or at least one polymer polyol, or any combination thereof.

The present invention also discloses a method of making a polyurethane. Such a method comprises contacting at least one polyisocyanate with a polyol formulation comprising a polymeric polyol composition, in the presence of a catalytically effective amount of a catalyst composition under conditions sufficient to produce the polyurethane. Additionally, the polyol formulation can further comprise at least one second polyol.

In another aspect, a polyurethane foam can be produced by contacting at least one polyisocyanate with a polyol formulation comprising a polymeric polyol composition, in the presence of at least one blowing agent and a catalytically effective amount of a catalyst composition under conditions sufficient to produce the polyurethane foam.

A further method for preparing a polyurethane foam is disclosed in another aspect of this invention. This method comprises:
(a) forming a premix comprising:
   (i) a polyol formulation comprising a polymeric polyol composition;
   (ii) about 0.5 to about 50 pphp blowing agent;
   (iii) zero to about 20 pphp water;
   (iv) about 0.05 to about 10 pphp crosslinker;
   (v) about 0.5 to about 10 pphp silicon surfactant;
   (vi) zero to about 50 pphp flame retardant;
   (vii) zero to about 20 pphp of a gelling catalyst or a blowing catalyst, or a combination thereof;
(b) contacting the premix with at least one polyisocyanate at an Isocyanate Index from about 40 to about 800. Parts by weight per hundred weight parts of the polyol formulation is abbreviated pphp.

The compositions of the present invention have multiple tertiary amine groups, which are useful in polyurethane gel and foam applications. In some aspects, the present invention provides polyurethane foams which are substantially free of volatile amines and/or amine odors.

BRIEF DESCRIPTION OF SEVERAL VIEWS OF THE DRAWINGS

FIG. 1 presents a plot of the foam height versus time for the foam formulations of Example 13 and Example 15.

DEFINITIONS

The following definitions and abbreviations are provided in order to aid those skilled in the art in understanding the detailed description of the present invention. To the extent that any definition or usage provided by any document incorporated herein by reference conflicts with the definition or usage provided herein, the definition or usage provided herein controls.

AHEW—amine hydrogen equivalent weight.
EO—ethylene oxide.
EW—hydroxyl equivalent weight of polyol.
Isocyanate Index—The actual amount of polyisocyanate used divided by the theoretically required stoichiometric amount of polyisocyanate required to react with all the active hydrogen in the reaction mixture, multiplied by 100. Also known as (Eq NCO/Eq of active hydrogen)× 100.
MDI—diphenyl methane diisocyanate.
Mn—number-average molecular weight.
Mw—weight-average molecular weight.
PO—propylene oxide.
pphp—parts by weight per hundred weight parts of the polyol formulation.
PUR—polyurethane.
TDI—toluene diisocyanate.

DETAILED DESCRIPTION OF THE INVENTION

Polymeric Polyol Compositions

The present invention discloses polymeric polyol compositions comprising polyol compounds, and methods of making such compositions. These polymeric polyol compositions often have a weight-average molecular weight (Mw) in a range from about 400 to about 20,000. Polymeric polyol compositions in accordance with the present invention comprise a reaction product of:

(a) a polymeric amine composition comprising amine compounds having the formula:

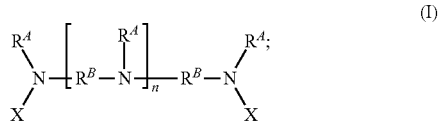

wherein:
each $R^A$ independently is a $C_1$-$C_6$ linear or branched alkyl;
each $R^B$ independently is a $C_3$-$C_6$ linear or branched alkanediyl;
each X independently is a hydrogen atom or $R^C$—$NH_2$;
$R^C$ is a $C_3$-$C_6$ linear or branched alkanediyl;
n is an integer in a range from 0 to 10; and
the polymeric amine composition has a number-average molecular weight (Mn) from about 250 to about 1500; and
(b) at least one epoxide compound having the formula:

at least one glycidyl ether compound having the formula:

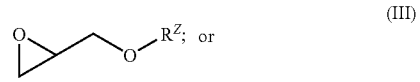

a combination thereof;
wherein:
$R^Y$ is hydrogen, phenyl, cyclohexyl, or a $C_1$-$C_{18}$ linear or branched alkyl;
$R^Z$ is hydrogen, phenyl, a $C_1$-$C_6$ linear or branched alkyl-substituted phenyl, or a $C_1$-$C_{18}$ linear or branched alkyl.

Polymeric polyol compositions of the present invention generally have a Mw in a range from about 400 to about 20,000. In another aspect, the polymeric polyol composition has a Mw in a range from about 500 to about 15,000, from about 600 to about 10,000, from about 700 to about 8000, or from about 800 to about 6000. In yet another aspect, the Mw of the polymeric polyol composition is in a range from about 900 to about 5500, or from about 1000 to about 5000. In a further aspect, the Mw of the polymeric polyol composition is between about 1500 and about 4500.

The Mw data in accordance with this disclosure, and the data presented in the Examples that follow, can be determined by Matrix-Assisted Laser Desorption/Ionization (MALDI) or Gel Permeation Chromatography. Note that the determination of Mw of the polymeric composition includes, for example, when the integer n in formula (I) equals zero.

According to one aspect of the present invention, the polymeric polyol composition has a hydroxyl number ranging from about 5 to about 600 mg KOH/g. In other aspects of the present invention, the polymeric polyol composition has a hydroxyl number from about 10 to about 550, from about 15 to about 500, or from about 20 to about 450. Yet, in another aspect, the hydroxyl number of the polymeric polyol composition is in a range from about 30 to about 400.

In another aspect of the present invention, the polymeric polyol composition can have a hydroxyl equivalent weight (EW) from about 75 to about 12,000. Alternatively, the polymeric polyol composition has an EW from about 100 to about 10,000, from about 125 to about 6,000, or from about 150 to about 4,000. In a different aspect, the EW of the polymeric polyol composition is in a range from about 200 to about 2,000.

Polymeric polyol compositions of this invention also can be characterized by an amine value. For instance, amine values of polymeric polyol compositions disclosed herein typically are in a range form about 10 to about 800 mg KOH/g. In some aspects of this invention, the amine values falls within a range from about 25 to about 700, such as, for example, from about 50 to about 600, or from about 75 to about 500.

By describing both $R^B$ and $R^C$ as "alkanediyl" moieties in formula (I), Applicants are specifying the number of carbon atoms in the respective moiety, along with the number of hydrogen atoms required to conform to the rules of chemical valence for the respective diyl moiety. For example, in formula (I), the fact that $R^B$ is bonded to two other groups is consistent with this description of an alkanediyl moiety.

Unless otherwise specified, alkanediyl groups described herein are intended to include all structural isomers, linear or branched, of a given moiety; for example, all enantiomers and all diasteriomers are included within this definition. As an example, unless otherwise specified, the term propanediyl is meant to include 1,1-propanediyl, 1,2-propanediyl, 1,3-propanediyl, and 2,2-propanediyl. Similarly, butanediyl is meant to include all stereo and regio diyl isomers of butane, for example, n-butane-1,1-diyl, n-butane-1,2-diyl, n-butane-1,3-diyl, n-butane-1,4-diyl, n-butane-2,3-diyl, 2-methylpropane-1,1-diyl, 2-methylpropane-1,3-diyl, and so forth.

It is within the scope of the present invention that each $R^A$ in formula (I) independently is a $C_1$-$C_6$ linear or branched alkyl. That is, each $R^A$ independently can be methyl, ethyl, propyl, butyl, pentyl, or hexyl, inclusive of all structural isomers. In another aspect, each $R^A$ independently is a $C_1$-$C_4$ linear or branched alkyl. For instance, $R^A$ can be selected independently from methyl, ethyl, and propyl (i.e., n-propyl and iso-propyl) in some aspects of this invention.

Each $R^B$ independently is a $C_3$-$C_6$ linear or branched alkanediyl, such as, for example, a $C_3$-$C_4$ linear or branched alkanediyl. In one aspect of this invention, $R^B$ can be a $C_3$ linear alkanediyl (i.e., 1,3-propanediyl).

In formula (I), each X independently is a hydrogen atom or $R^C$—$NH_2$. When X is $R^C$—$NH_2$, $R^C$ can be a $C_3$-$C_6$ linear or branched alkanediyl. Alternatively, $R^C$ is a $C_3$-$C_4$ linear or branched alkanediyl in another aspect of the present invention. Yet, in another aspect, $R^C$ is a $C_3$ linear alkanediyl (i.e., 1,3-propanediyl).

For instance, in accordance with one aspect of the present invention, a polymeric amine composition comprising amine compounds having formula (I) is provided in which each $R^A$ is a methyl group, each $R^B$ is a $C_3$ linear alkanediyl (i.e., 1,3-propanediyl), each X is $R^C$—$NH_2$, wherein $R^C$ is a $C_3$ linear alkanediyl (i.e., 1,3-propanediyl).

The polymeric polyol compositions and polymeric amine compositions disclosed herein are described as polymers, indicating that they comprise at least one repeating unit. Applicants' use of the term "polymer" is meant to include all molecular weight polymers, including lower molecular weight polymers or oligomers. Since there is not an industry accepted cutoff in molecular weight between a polymer and an oligomer, Applicants have elected to use the term polymer throughout this disclosure and intend for the term polymer to encompass oligomers as well.

Since the compositions of the present invention are polymeric, they necessarily include mixtures of different size molecules, with different numbers of repeating units. Further, for a polymeric amine composition comprising amine compounds having the formula:

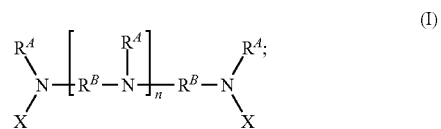

(I)

wherein $R^A$, $R^B$, and X are as indicated above, the integer n can be zero.

For instance, the moiety within the brackets of formula (I) illustrates a repeating unit in a given molecule or compound, where the integer "n" represents the number of repeating units in that molecule or compound. Since the polymeric amine composition disclosed herein is polymeric, it is necessarily represented by a mixture of molecules or compounds of various sizes, i.e., various values of n. It is within the scope of the present invention for the integer n to vary from 0 to 50 or more. In a different aspect, n ranges from 0 to 40, or from 0 to 30, or from 0 to 20. In an accordance with another aspect of this invention, n is in a range from 0 to 10. In a different aspect of this invention, n can range from 1 to 50, from 1 to 40, from 1 to 30, or from 1 to 20. Further, n can range from 1 to 10 in one aspect of the present invention. It is understood that n represents an integer designating the number of repeating units for a single molecule or compound within the polymeric composition, where the polymeric composition has a distribution of values of n, a distribution of molecular sizes, and a distribution of molecular weights. An average value of n in formula (I) can be readily determined from the respective number-average molecular weight (Mn), as disclosed in U.S. Patent Publication No. 2008-0194776, published on Aug. 14, 2008, and U.S. patent application Ser. No. 11/740,307, filed on Apr. 26, 2007, both of which are incorporated herein by reference in their entirety. Determining an average value of n would not necessarily result in an integer or a whole number, depending upon the respective molecular weight distribution.

The number-average molecular weight (Mn) of the polymeric amine composition generally falls between about 200 and about 2500. In some aspects of this invention, the Mn of the polymeric amine composition is in a range from about 250 to about 1500. In other aspects of this invention, the Mn of the polymeric amine composition can be in a range from about 275 to about 1000, for example, from about 300 to about 800.

The polymeric polyol compositions of the present invention are described as polyols, indicating that they comprise at least one hydroxyl moiety. Applicants have elected to use the term "polyol" throughout this disclosure and intend for the term "polyol" to encompass "diols" as well. Polymeric polyol compositions of the present invention can act as autocatalytic polyols in certain polyurethane gel and foam applications.

Polymeric polyol compositions of the present invention comprise a reaction product of the polymeric amine composition comprising amine compounds having formula (I) and at least one epoxide compound having the formula:

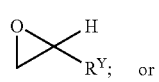

(II)

at least one glycidyl ether compound having the formula:

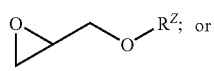

(III)

combinations thereof.

In formula (II), $R^Y$ can be hydrogen, phenyl, cyclohexyl, or a $C_1$-$C_{18}$ linear or branched alkyl. In accordance with one aspect of the present invention, $R^Y$ is methyl, ethyl, propyl, butyl, pentyl, hexyl, heptyl, 2-ethylhexyl, octyl, decyl, dodecyl, tetradecyl, hexadecyl, or octadecyl. In another aspect, $R^Y$ can be hydrogen, phenyl, or cyclohexyl. In yet another aspect, $R^Y$ is hydrogen, methyl, or phenyl. In this aspect, where $R^Y$ is hydrogen, methyl, or phenyl, the epoxide compounds of formula (II) are, respectively, ethylene oxide, propylene oxide, or styrene oxide.

$R^Z$ in formula (III) can be hydrogen, phenyl, a $C_1$-$C_6$ linear or branched alkyl-substituted phenyl, or a $C_1$-$C_{18}$ linear or branched alkyl. For instance, $R^Z$ can be hydrogen, phenyl, or a $C_1$-$C_6$ linear or branched alkyl-substituted phenyl, in one aspect of this invention. $R^Z$ is methyl, ethyl, propyl, butyl, pentyl, hexyl, heptyl, 2-ethylhexyl, octyl, decyl, dodecyl, tetradecyl, hexadecyl, or octadecyl, in another aspect of this invention. Yet, $R^Z$ can be phenyl or butyl-substituted phenyl in still another aspect of this invention.

In accordance with the present invention, methods of making these polymeric polyol compositions are disclosed. Methods of producing the polymeric amine composition starting material useful for the synthesis of a polymeric polyol composition are disclosed in U.S. Patent Publication No. 2008-0194776, published on Aug. 14, 2008, and U.S. patent application Ser. No. 11/740,307, filed on Apr. 26, 2007, both of which are incorporated herein by reference in their entirety. One such method comprises:

A. combining a first primary amine with an α,β-unsaturated ketone, aldehyde, or first nitrile to form an intermediate ketone, aldehyde, or first nitrile;
B. introducing the intermediate ketone, aldehyde, or first nitrile to a first liquid phase containing a second primary amine in the presence of hydrogen to form a secondary diamine polymer, wherein the second primary amine can be the same as or different from the first primary amine;
C. combining the secondary diamine polymer with an α,β-unsaturated second nitrile to form bis-cyanoethylated compounds, wherein the second nitrile can be the same as or different from the first nitrile; and
D. introducing the bis-cyanoethylated compounds to a second liquid phase in the presence of hydrogen to form a polymeric amine composition.

This method can result in a polymeric amine composition which comprises amine compounds having the formula (I), wherein:

each $R^A$ independently is a $C_1$-$C_6$ linear or branched alkyl;
each $R^B$ independently is a $C_3$-$C_6$ linear or branched alkanediyl;
each X independently is a hydrogen atom or $R^C$—$NH_2$;
$R^C$ is a $C_3$-$C_6$ linear or branched alkanediyl;
n is an integer in a range from 0 to 10; and the polymeric amine composition has a number-average molecular weight (Mn) from about 250 to about 1500.

A general procedure for producing a polymeric polyol composition from an amine compound or polymeric amine composition is as follows. First, the amine is reacted with at least one epoxide compound, at least one glycidyl ether compound, or combinations thereof. For illustration, the synthesis will be described generically for ethylene oxide or propylene oxide, but scope of the invention is not limited to only these epoxide compounds. The amine compound or composition is reacted with ethylene oxide or propylene oxide, usually at temperatures in the range of 40° C. to 120° C. The amount of oxide required is typically based on the stoichiometric amount of active hydrogens in the amine compound or composition. Upon the completion of the addition of the respective oxide, the reaction mixture can be maintained at 40-120° C. for about two hours until all of the oxide has reacted.

The polyol initiator obtained in this reaction is then mixed with a catalyst and this mixture is subsequently reacted with ethylene oxide or propylene oxide at a temperature in a range from about 100° C. to about 160° C. A traditional catalyst used in this reaction, and known to those of skill in the art, is KOH. Other alkaline hydroxide or hydroxide hydrate catalysts based on Ba (barium) or Sr (strontium) can be employed as the alkoxylation catalyst, producing products with less unsaturation than those produced using the traditional KOH catalyst. Processes for producing polyols using Ba or Sr catalysts are described in U.S. Pat. Nos. 5,070,125; 5,010,187; and 5,114,619, the disclosures of which are incorporated by reference in their entirety. High levels of unsaturation, especially with polyols of high equivalent weight, act as chain terminators in polyurethane foam production, giving rise to, for example, foams with poor compressive strength, poor tensile strength, reduced reactivity, and reduced aging performance under humid conditions. The Ba and Sr catalysts also provide improved primary hydroxyl capping efficiency for the same weight percentage of ethylene oxide used. When using Ba or Sr catalysts, water can be added during the reaction of the ethylene oxide or propylene oxide with the initiator. This water addition can reduce the amount of unsaturation in the final polyol product. Another catalyst that can be used to produce polyols is a double metal cyanide catalyst, which may provide a different molecular weight distribution of the polymeric polyol composition from that achieved using KOH. Examples of double metal cyanide catalysts are provided in U.S. Pat. Nos. 5,470,813; 5,589,431; and 6,008,263, the disclosures of which are incorporated herein by reference in their entirety.

In one aspect using propylene oxide as the reactant, the reaction mixture containing the polyol initiator and catalyst (in water) is heated to a temperature in a range from about 100° C. to about 160° C. and the pressure is reduced to remove water but not volatilize other materials from the reaction mixture. Water is removed until the point at which the hydroxide catalyst is no longer dissolved. At a temperature of about 100° C., propylene oxide is fed to the reactor at a flow rate sufficient to maintain the pressure in the reactor in the 30-60 psig range. The rate of addition and the amount of the propylene oxide added depends upon the type of polyol desired. Additionally, if desired, the product can then be subsequently capped with ethylene oxide at the same temperature and pressure to give a polyol containing primary hydroxyl groups. A generalized reaction scheme for the synthesis of a polyol from an amine compound is shown below for a compound with a general formula R—$NH_2$ where R can be, in some aspects, a group that contains active hydrogen atoms. KOH catalyst and propylene oxide reactant are illustrated, and $y_1$ and $y_2$ independently are integers in a range from 1 to 60.

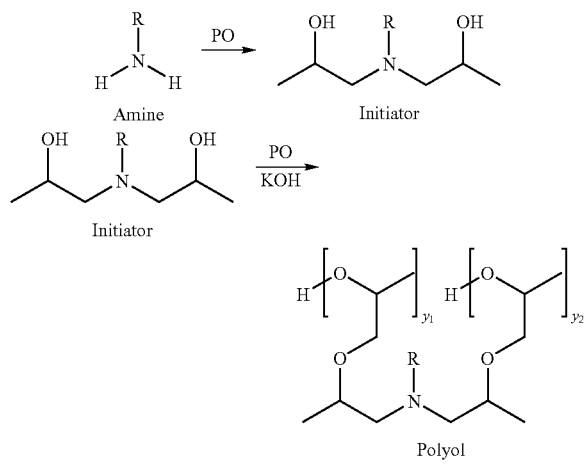

After formation of the polyol, neutralization of the residual alkaline catalyst is required, followed by filtration of the resulting salt, if necessary. Insufficient neutralization can lead to unwanted problems in PUR foam production such as inconsistent rates and amounts of foaming of the polyurethane, and off-colors. One traditional neutralization agent is hydrochloric acid. An alternative to hydrochloric acid for neutralization is the use of an excess of formic acid, as described in U.S. Pat. No. 4,877,879, which is incorporated herein by reference in its entirety. The excess formic acid can be decomposed into carbon dioxide and hydrogen at elevated temperatures if desired.

If the alkaline catalyst used to produce the polyol is KOH and the neutralization is with formic acid, the resulting potassium formate salt generally is soluble in the polyol mixture. If barium or strontium hydroxide is used, filtration may be necessary to remove the salt.

Removal of volatile materials may be needed depending on the method of synthesis used, catalyst type, initial water content, degree of polyol isomerization, etc. Vacuum distillation can be used to remove low boiling point or volatile material from the polymeric polyol composition. Other methods of forming a polyol from an amine are known to those of skill in the art, including processes described in U.S. Pat. No. 5,476,969, U.S. Pat. No. 5,589,431, and PCT Publication WO 2004/060956, the disclosures of which are incorporated herein by reference in their entirety.

Applicants disclose several types of ranges in the present invention. These include, but are not limited to, a range of number of atoms, a range of integers, a range of molecular weights, a range of equivalent weights, a range of hydroxyl numbers, and a range of temperatures. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that "$R^Y$" can be a $C_1$ to $C_{18}$ linear or branched alkyl group, or in alternative language having from 1 to 18 carbon atoms, as used herein, refers to a "$R^Y$" group that can be selected independently from a linear or branched alkyl group having 1, 2, 3, 4, 5, 6, 7, 8, 9, 10, 11, 12, 13, 14, 15, 16, 17, or 18 carbon atoms, as well as any range between these two numbers (for example, a $C_1$ to $C_6$ alkyl), and also including any combination of ranges between these two numbers (for example, a $C_3$ to $C_6$ and $C_8$ to $C_{12}$ alkyl group).

Similarly, another representative example follows for the weight-average molecular weight (Mw) of the polymeric polyol compositions. By a disclosure that the polymeric polyol composition has a Mw from about 400 to about 20,000, applicants intend to recite that the Mw can be selected from about 400, about 500, about 600, about 700, about 800, about 900, about 1000, about 1100, about 1200, about 1300, about 1400, about 1500, about 1600, about 1700, about 1800, about 1900, about 2000, about 2100, about 2200, about 2300, about 2400, about 2500, about 2600, about 2700, about 2800, about 2900, about 3000, about 3100, about 3200, about 3300, about 3400, about 3500, about 3600, about 3700, about 3800, about 3900, about 4000, about 4100, about 4200, about 4300, about 4400, about 4500, about 4600, about 4700, about 4800, about 4900, about 5000, about 5100, about 5200, about 5300, about 5400, about 5500, about 5600, about 5700, about 5800, about 5900, about 6000, about 6100, about 6200, about 6300, about 6400, about 6500, about 6600, about 6700, about 6800, about 6900, about 7000, about 7100, about 7200, about 7300, about 7400, about 7500, about 7600, about 7700, about 7800, about 7900, about 8000, about 8100, about 8200, about 8300, about 8400, about 8500, about 8600, about 8700, about 8800, about 8900, about 9000, about 9100, about 9200, about 9300, about 9400, about 9500, about 9600, about 9700, about 9800, about 9900, about 10,000, about 10,500, about 11,000, about 11,500, about 12,000, about 12,500, about 13,000, about 13,500, about 14,000, about 14,500, about 15,000, about 15,500, about 16,000, about 16,500, about 17,000, about 17,500, about 18,000, about 18,500, about 19,000, about 19,500, or about 20,000. Additionally, the Mw can be within any range from about 400 to about 20,000 (for example, the Mw is in a range from about 1000 to about 5000), and this also includes any combination of ranges between about 400 and about 20,000. Likewise, all other ranges disclosed herein should be interpreted in a manner similar to these two examples. Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or formulations described herein. Combining additional materials or components can be done by any method known to one of skill in the art. Further, the term "contact product" includes mixtures, blends, solutions, slurries, reaction products, and the like, or combinations thereof. Although "contact product" can include reaction products, it is not required for the respective components to react with one another.

While compositions and methods are described in terms of "comprising" various components or steps, the compositions and methods can also "consist essentially of" or "consist of" the various components or steps.

Polyol Formulations

A polyol formulation is provided in another aspect of the present invention. Such a formulation comprises a contact product of:
(i) a polymeric polyol composition and
(ii) at least one second polyol, wherein the at least one second polyol is at least one polyether polyol, at least one polyester polyol, or at least one polymer polyol, or any combination thereof.

The polymeric polyol composition generally has a Mw from about 400 to about 20,000 and comprises a reaction product of:
(a) a polymeric amine composition comprising amine compounds having the formula:

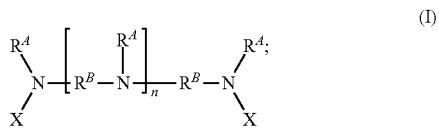

wherein:
each $R^A$ independently is a $C_1$-$C_6$ linear or branched alkyl;
each $R^B$ independently is a $C_3$-$C_6$ linear or branched alkanediyl;
each X independently is a hydrogen atom or $R^C$—$NH_2$;
$R^C$ is a $C_3$-$C_6$ linear or branched alkanediyl;
n is an integer in a range from 0 to 10; and
the polymeric amine composition has a number-average molecular weight (Mn) from about 250 to about 1500; and
(b) at least one epoxide compound having the formula:

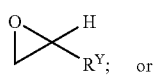

at least one glycidyl ether compound having the formula:

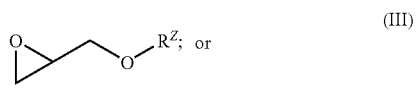

a combination thereof;
wherein:
$R^Y$ is hydrogen, phenyl, cyclohexyl, or a $C_1$-$C_{18}$ linear or branched alkyl;
$R^Z$ is hydrogen, phenyl, a $C_1$-$C_6$ linear or branched alkyl-substituted phenyl, or a $C_1$-$C_{18}$ linear or branched alkyl.

Polyols can be used with polyisocyanates to form polyurethanes and polyurethane foams of this invention, as discussed below. In one aspect, a polymeric polyol composition of the present invention can be used with polyisocyanates without the addition of other polyols.

Alternatively, a polyol formulation can be used. Such a formulation comprises a contact product of a polymeric polyol composition with at least one second polyol, wherein the at least one second polyol is at least one polyether polyol, at least one polyester polyol, or at least one polymer polyol, or any combination thereof. In the polyol formulation, the weight ratio of the polymeric polyol composition to the at least one second polyol can range from about 50:1 to about 1:5,000. In other aspects, the weight ratio of the polymeric polyol composition to the at least one second polyol in the polyol formulation can range from about 10:1 to about 1:1,000, from about 5:1 to about 1:500, or from about 4:1 to about 1:250 Yet, in other aspect, the weight ratio of the polymeric polyol composition to the at least one second polyol is in a range from about 3:1 to about 1:100, or from about 2:1 to about 1:50.

Suitable second polyols that can be used in polyol formulations, and subsequently in PUR foam formation processes, if desired, include polyalkylene ether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols, Polyols include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, sugars such as sucrose and like low molecular weight polyols, or a combination thereof.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of di- and tri-functional materials and/or different molecular weight or different chemical composition materials can be used. In yet another aspect of the present invention, polyester polyols can be used, including those produced when a dicarboxylic acid is reacted with an excess of a diol. Non-limiting examples include adipic acid or phathalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds, or polyols, such as polyester polyols and polyether polyols, and combinations thereof, are useful in the present invention.

In addition to polyester and polyether polyols, a polymer polyol can be employed. A polymer polyol is not a polymeric polyol composition of this invention. A polymeric polyol composition, as discussed above, comprises a reaction product of a polymeric amine composition comprising amine compounds having formula (I) and at least one epoxide compound having formula (II), or at least one glycidyl ether compound having formula (III), or a combination thereof. Polymer polyols can be used, for example, in polyurethane foams to increase the foam's resistance to deformation, i.e., to increase the load-bearing properties of the foam. Suitable polymer polyols (including copolymer polyols) are known to those of skill in the art and include, but are not limited to, graft polyols, polyurea modified polyols, and the like, or mixtures thereof. A graft polyol can be a triol in which vinyl monomers, such as styrene and acrylonitrile, are graft copolymerized. A polyurea modified polyol can be a polyol containing a polyurea dispersion formed by the reaction of a diamine with TDI. TDI is used often in excess, so some of the TDI may react with both the polyol and polyurea. A variation of the polyurea modified polyol is abbreviated PIPA polyol, and is formed by the in-situ polymerization of TDI and alkanolamine in the polyol.

In another aspect, the at least one second polyol that is useful in the compositions or formulations of the present invention is at least one polyether polyol, at least one polyester polyol, or at least one polymer polyol, or any combination thereof. Depending on the load-bearing requirements and the particular end-use application of the foam, polymer polyols can be absent from the polyol formulation, or can comprise up to about 100 percent of the at least one second polyol portion of the polyol formulation. In another aspect, polymer polyols can comprise from about 10 percent to about 80 percent by weight, or from about 25 percent to about 65 percent by weight, of the second polyol portion of the polyol formulation.

With respect to the present invention, when a quantity by weight of a material in a composition or formulation is discussed, the quantity will depend on the total amount of polyol employed. Hence, pphp is the parts by weight per hundred weight parts of the polyol formulation. As an example, if the polyol formulation includes 50% of a polymeric polyol composition of the present invention and 50% of a polyester polyol, the total polyol in the formulation is used to determine the pphp of other materials. The pphp of a blowing agent used, for example, in a polyurethane foam formulation thus depends on the total amount of polyol in the polyol formulation (polymeric polyol composition plus all other polyols).

Polyisocyanates

Polyisocyanates that are useful in the polyurethane gel or foam formation process include, but are not limited to, hexamethylene diisocyanate, isophorone diisocyanate, phenylene diisocyanate, toluene diisocyanate (TDI), diphenyl methane diisocyanate isomers (MDI), hydrated MDI and 1,5-naphthalene diisocyanate. For example, 2,4-TDI, 2,6-TDI, and mixtures thereof, can be readily employed in the present invention. Other suitable mixtures of diisocyanates include, but are not limited to, those known in the art as crude MDI, or PAPI, which contain 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's. In yet another aspect, the polyisocyanate comprises MDI or TDI, or a combination thereof.

The compositions and the methods of making PUR foam of the present invention can be used to produce many types of foam. The compositions are useful, for example, in the formation of foam products for rigid, semi-rigid, and flexible applications, each of which can require a different Isocyanate Index. As defined previously, Isocyanate Index is the actual amount of polyisocyanate used divided by the theoretically required stoichiometric amount of polyisocyanate required to react with all the active hydrogen in the reaction mixture, multiplied by 100. For purposes of the present invention, Isocyanate Index is represented by the equation: Isocyanate Index=(Eq NCO/Eq of active hydrogen)×100, wherein Eq NCO is the number of NCO functional groups in the polyisocyanate, and Eq of active hydrogen is the number of equivalent active hydrogen atoms.

Foam products which are produced with an Isocyanate Index from about 40 to about 800 are within the scope of this invention. In accordance with other aspects of the present invention, the Isocyanate Index is from about 50 to about 500, or from about 60 to about 300. Alternatively, foam products produced with an Isocyanate Index from about 70 to about 200 are useful in other aspects of this invention.

Urethane Catalysts

The presence of multiple tertiary amine groups in the polymeric polyol compositions of the present invention can either reduce or eliminate the need to include a conventional urethane catalyst when formulating a polyurethane polymer or foam. However, in other aspects of the present invention, urethane catalysts can be employed in compositions or formulations along with such polymeric polyol compositions.

Generally, polyurethane foam catalyst systems comprise compounds which accelerate both the blowing (water-isocyanate) and gelling (polyol-isocyanate) reactions. It is beneficial to balance these reactions in order to produce quality foams with acceptable properties. Compositions and formulations of the present invention can comprise a single compound which accelerates, but keeps in balance, both the blowing and gelling reactions. Alternatively, the compositions can comprise at least one catalyst that predominantly accelerates the blowing reaction (a blowing catalyst), or at least one catalyst that predominantly accelerates the gelling reaction (a gelling catalyst), or a combination thereof. As described herein, a blowing catalyst is a catalyst that predominantly accelerates the blowing reaction, but can also, in certain circumstances, accelerate the gelling reaction, albeit to a lesser degree. Similarly, a gelling catalyst is a catalyst that predominantly accelerates the gelling reaction, but can also, in certain circumstances, accelerate the blowing reaction, albeit to a lesser degree.

Urethane catalysts that are suitable for use in the compositions described herein include, but are not limited to, metal salt catalysts, organometallic compounds, compounds with amine functionality, or combination thereof. Non-limiting metal salt catalysts and organometallic compounds include organotins, organobismuths, tin salts, bismuth salts, and the like, or any combination thereof. Amine compounds can include, for example, gelling catalysts such as triethylenediamine (TEDA), N-methylimidazole, 1,2-dimethylimidazole, N-methylmorpholine (commercially available as the DABCO® NMM catalyst), N-ethylmorpholine (commercially available as the DABCO® NEM catalyst), triethylamine (commercially available as the DABCO® TETN catalyst), N,N'-dimethylpiperazine, 1,3,5-tris(dimethylaminopropyl)hexahydrotriazine (commercially available as the Polycate 41 catalyst), 2,4,6-tris(dimethylaminomethyl)phenol (commercially available as the DABCO TMR® 30 catalyst), N-methyldicyclohexylamine (commercially available as the Polycat® 12 catalyst), pentamethyldipropylene triamine (commercially available as the Polycat® 77 catalyst), N-methyl-N'-(2-dimethylamino)-ethyl-piperazine, tributylamine, dimethylaminocyclohexylamine (commercially available as the Polycat® 8 catalyst), pentamethyldipropylene-triamine, triethanolamine, dimethylethanolamine, tris(3-dimethylamino)propylamine (commercially available as the Polycat® 9 catalyst), 1,8-diazabicyclo[5.4.0] undecene (commercially available as the DABCO® DBU catalyst or its acid blocked derivatives, and the like, as well as any combination thereof. Non-fugitive tertiary amine catalysts include both gelling and blowing catalysts. Exemplary gelling catalysts include N,N-bis(3-dimethylamino-propyl) N-isopropanolamine, N,N-dimethylaminoethyl-N'-methyl ethanolamine (commercially available as the DABCO® T catalyst), N,N,N'-trimethylaminopropyl ethanolamine (commercially available as the Polycat® 17 catalyst), N,N-dimethylethanolamine (commercially available as the DABCO® DMEA catalyst), N,N-dimethyl-N',N'-2-hydroxy(propyl)-1,3-propylenediamine, dimethylaminopropylamine (DMAPA); N,N-dimethylaminoethoxy)ethanol, methyl-hydroxy-ethyl-piperazine, bis(N,N-dimethyl-3-aminopropyl) amine (commercially available as the Polycat® 15 catalyst, N,N-dimethylaminopropyl urea (commercially available as DABCO® NE1060 or DABCO® NE1070 catalysts), N,N'-bis(3-dimethylaminopropyl) urea (commercially available as DABCO® NE1060 or DABCO® NE1070 catalysts), bis(dimethylamino)-2-propanol, N-(3-aminopropyl)imidazole, N-(2-hydroxypropyl)imidazole, N-(2-hydroxyethyl) imidazole, and the like, or any other gelling catalyst containing an isocyanate reactive group. Blowing catalysts include, but are not limited to, pentamethyldiethylenetriamine (commercially available as the Polycat® 5 catalyst), hexamethyltriethylenetetramine, heptamethyltetraethylenepentamine, bis(dimethylaminoethyl)ether (commercially available as the DABCO® BL19 catalyst, and the like, as well as any combination thereof. As noted earlier, some of these catalysts can accelerate both the gelling and blowing reactions.

Exemplary non-fugitive blowing catalysts include 2-[N-(dimethylaminoethoxyethyl)-N-methylamino]ethanol (commercially available as the DABCO® NE200 catalyst), dimethylaminoethoxyethanol, N,N,N'-trimethyl-N'-3-aminopropyl-bis(aminoethyl)ether, N,N,N'-trimethyl-N'-aminopropyl-bis(aminoethyl)ether (commercially available as the DABCO® NE300 catalyst), and the like, or any tertiary amine blowing catalyst containing an isocyanate reactive group.

Additionally, some of these catalysts also can accelerate the trimerization reaction, i.e., the reaction of polyisocyanates to form polyisocyanurates. Although not a requirement, compositions of the present invention can further comprise other catalytic materials, such as carboxylate salts, which can also accelerate the trimerization reaction.

With respect to the present invention, when a quantity by weight of a catalyst composition is discussed, the quantity will include the total amount of all catalysts, unless stated otherwise. As an example, if 0.8 pphp of a gelling catalyst and 0.7 pphp of a blowing catalyst are used in a given catalyst composition, the amount of the total polyurethane foam catalyst is 1.5 pphp.

Blowing Agents

Blowing agents that can be used alone or in combination in the PUR foam formation process include, but are not limited to, water, methylene chloride, acetone, chlorofluorocarbons (CFCs), hydrofluorocarbons (HFCs), hydrochlorofluorocarbons (HCFCs), and hydrocarbons. Non-limiting examples of HFCs include HFC-245fa, HFC-134a, and HFC-365. Illustrative examples of HCFCs include HCFC-141b, HCFC-22, and HCFC-123. Exemplary hydrocarbons include n-pentane, iso-pentane, cyclopentane, and the like, or any combination thereof.

The amount of blowing agent used can vary based on, for example, the intended use and application of the foam product and the desired foam stiffness and density. In the foam formulations and methods for preparing polyurethane foams of the present invention, the blowing agent is present in amounts from about 0.5 to about 50 parts by weight per hundred weight parts of the polyol formulation (pphp), from about 1 to about 35 pphp, from about 1.5 to about 20 pphp, or from about 2 to about 10 pphp. If water is present in the formulation, for use as a blowing agent or otherwise, water can be present in amounts up to about 20 pphp. In other words, water can range from 0 to about 20 pphp. In another aspect, water can range from 0 to about 15 pphp, from 0 to about 12 pphp, from 0 to about 8 pphp, or from 0 to about 4 pphp.

Miscellaneous Additives

Depending upon on the requirements during foam manufacturing or for the end-use application of the foam product, various additives can be employed in the compositions and PUR foam formulations to tailor specific properties. These include, but are not limited to, crosslinkers, cell stabilizers, flame retardants, chain extenders, epoxy resins, acrylic resins, fillers, pigments, and the like, or any combination thereof. It is understood that other mixtures or materials that are known in the art can be included in the compositions and foam formulations and are within the scope of the present invention.

Suitable crosslinkers include, but are not limited to, diethanolamine, diisopropanolamine, triethanolamine, tripropanolamine, and the like, or any combination thereof. Such crosslinkers also can function as urethane catalysts due to the presence of an amine group in their chemical structure. Crosslinkers can be present in the foam formulation in amounts from about 0.05 to about 10 pphp, about 0.1 to about 8 pphp, about 0.2 to about 6 pphp, about 0.3 to about 4 pphp, about 0.4 to about 3 pphp, or about 0.5 to about 2 pphp. Cell stabilizers include surfactants such as organopolysiloxanes. Silicon surfactants can be present in the foam formulation in amounts from about 0.5 to about 10 pphp, about 0.6 to about 9 pphp, about 0.7 to about 8 pphp, about 0.8 to about 7 pphp, about 0.9 to about 6 pphp, about 1 to about 5 pphp, or about 1.1 to about 4 pphp. Useful flame retardants include halogenated organophosphorous compounds and non-halogenated compounds. A non-limiting example of a halogenated flame retardant is trichloropropylphosphate (TCPP). For example, triethylphosphate ester (TEP) and DMMP are non-halogenated flame retardants. Depending on the end-use foam application, flame retardants can be present in the foam formulation in amounts from 0 to about 50 pphp, from 0 to about 40 pphp, from 0 to about 30 pphp, or from 0 to about 20 pphp. In another aspect, the flame retardant is present from 0 to about 15 pphp, 0 to about 10 pphp, 0 to about 7 pphp, or 0 to about 5 pphp. Chain extenders, such as diols (e.g., ethylene glycol, butane diol), can also be employed in the present invention.

Polyurethane and Polyurethane Foam Formulations and Processes

In one aspect, the present invention provides for a composition comprising a contact product of:
(i) at least one polyisocyanate; and
(ii) a polyol formulation comprising a polymeric polyol composition, wherein the polymeric polyol composition comprises a reaction product of:
(a) a polymeric amine composition comprising amine compounds having the formula:

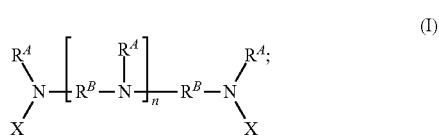

(I)

wherein:
each $R^A$ independently is a $C_1$-$C_6$ linear or branched alkyl;
each $R^B$ independently is a $C_3$-$C_6$ linear or branched alkanediyl;
each X independently is a hydrogen atom or $R^C$—$NH_2$;
$R^C$ is a $C_3$-$C_6$ linear or branched alkanediyl;

n is an integer in a range from 0 to 10; and
the polymeric amine composition has a number-average molecular weight (Mn) from about 250 to about 1500; and (b) at least one epoxide compound having the formula:

(II)

or at least one glycidyl ether compound having the formula:

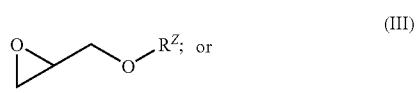

(III)

or a combination thereof;
wherein:
$R^Y$ is hydrogen, phenyl, cyclohexyl, or a $C_1$-$C_{18}$ linear or branched alkyl;
$R^Z$ is hydrogen, phenyl, a $C_1$-$C_6$ linear or branched alkyl-substituted phenyl, or a $C_1$-$C_{18}$ linear or branched alkyl.

In this aspect, the composition can further comprise at least one urethane catalyst, wherein the least one urethane catalyst is at least one gelling urethane catalyst or at least one blowing urethane catalyst, or a combination thereof. This composition also can further comprise at least one additive, wherein the at least one additive is at least one crosslinker, at least one cell stabilizer, at least one flame retardant, at least one chain extender, at least one epoxy resin, at least one acrylic resin, at least one filler, or at least one pigment, or any combination thereof. Further, additional polyols can be employed. In addition to the polymeric polyol composition, the polyol formulation can further comprise at least one second polyol, wherein the at least one second polyol is at least one polyether polyol, at least one polyester polyol, or at least one polymer polyol, or any combination thereof. The at least one polyisocyanate can comprise diphenyl methane diisocyanate or toluene diisocyanate, or a combination thereof, in this aspect of the invention.

In accordance with another aspect of the present invention, a method of making a polyurethane is provided. Such a method can comprise contacting at least one polyisocyanate with a polyol formulation comprising a polymeric polyol composition, in the presence of a catalytically effective amount of a catalyst composition under conditions sufficient to produce the polyurethane. The conditions sufficient to produce the polyurethane would be readily known to one of ordinary skill in the art. The polymeric polyol composition in the polyol formulation comprises a reaction product of a polymeric amine composition comprising amine compounds having formula (I) and at least one epoxide compound having formula (II), or at least one glycidyl ether compound having formula (III), or a combination thereof. Additionally, the polyol formulation can further comprise at least one second polyol, wherein the at least one second polyol is at least one polyether polyol, at least one polyester polyol, or at least one polymer polyol, or any combination thereof.

Catalysts useful in the present invention can catalyze the reaction between an isocyanate functionality and an active hydrogen-containing compound (e.g., an alcohol, a polyol, an amine, water) and especially the urethane (gelling) reaction of polyol hydroxyl groups with isocyanate to make polyurethanes and the blowing reaction of water with isocyanate to release carbon dioxide for making polyurethane foam. Catalyst compositions can comprise at least one gelling urethane catalyst or at least one blowing urethane catalyst, or combinations thereof. Such compositions are present in the PUR gel or foam formulations in a catalytically effective amount. In the PUR and PUR foam formulations and methods of their preparation disclosed herein, the catalyst composition often is present in amounts from about 0.01 to about 20 parts by weight per hundred weight parts of the polyol formulation (pphp). In another aspect, the catalyst composition is present in amounts ranging from about 0.05 to about 15 pphp, from about 0.1 to about 10 pphp, from about 0.15 to about 5 pphp, from about 0.2 to about 4 pphp, or from about 0.25 to about 2 pphp.

In a further aspect, a polyurethane foam can be produced by contacting at least one polyisocyanate and a polyol formulation comprising a polymeric polyol composition, in the presence of at least one blowing agent and a catalytically effective amount of a catalyst composition under conditions sufficient to produce the polyurethane foam. The conditions sufficient to produce the polyurethane foam would be readily known to one of ordinary skill in the art. For instance, activation of the blowing agent can occur at a specific reaction temperature, or the blowing agent can react with isocyanate, for example, if the blowing agent comprises water.

Additionally, the contacting of the at least one polyisocyanate and the polyol formulation comprising a polymeric polyol composition, in the presence of at least one blowing agent and a catalytically effective amount of a catalyst composition, can occur in the presence of at least one additive selected from at least one crosslinker, at least one cell stabilizer, at least one flame retardant, at least one chain extender, at least one epoxy resin, at least one acrylic resin, at least one filler, and at least one pigment, or any combination thereof.

In accordance with methods of making polyurethane foam of the present invention, PUR foams can be produced having a tailored density. For example, PUR foams can be produced having a density from about 20 Kg/m³ to about 250 Kg/m³, from about 24 Kg/m³ to about 60 Kg/m³, or from about 35 Kg/m³ to about 50 Kg/m³. Articles of manufacture can be produced which comprise PUR foam prepared in accordance with any of the methods disclosed herein.

Optionally, in yet another aspect, the method of the present invention can produce PUR foams with no or substantially no undesirable amine odor. In this aspect, the method for preparing PUR foam has thermally stability up to about 80° C., up to about 100° C., up to about 120° C., or up to about 150° C. In a still further aspect, the method of the present invention produces PUR foam that is substantially free of volatile amines and/or amine odors.

In accordance with one aspect of the method of the present invention, the components of the PUR foam formulation are contacted substantially contemporaneously. For example, at least one polyisocyanate, a polyol formulation comprising a polymeric polyol composition, at least one blowing agent and a catalytically effective amount of a catalyst composition are contacted together. Given the number of components involved in polyurethane formulations, there are many different orders of combining the components, and one of skill in the art would realize that varying the order of addition of the components falls within the scope of the present invention. As well, for each of the different orders of combining the aforementioned components of the foam formulation, the polyol formulation of the present invention can further comprise at least one second polyol, wherein the at least one second polyol is at least one polyether polyol, at least one polyester polyol, or at least one polymer polyol, or any combination thereof. In addition, the method of producing PUR foams can further comprise the presence of at least one additive selected from at least one crosslinker, at least one cell stabilizer, at least one flame retardant, at least one chain extender, at least one epoxy resin, at least one acrylic resin, at least one filler, and at least one pigment, or any combination thereof. In one aspect of the present invention, all of the components, including optional components, are contacted substantially contemporaneously.

In another aspect of the present invention, a premix of ingredients other than the at least one polyisocyanate are contacted first, followed by the addition of the at least one polyisocyanate. For example, a polyol formulation comprising a polymeric polyol composition, at least one blowing agent, and a catalyst composition are contacted initially to form a premix. The premix is then contacted with the at least one polyisocyanate to produce PUR foams in accordance with a method of the present invention. In a further aspect of the present invention, the same method can be employed, wherein the polyol formulation in the premix further comprises at least one second polyol. Likewise, the premix can further comprise at least one additive selected from at least one crosslinker, at least one cell stabilizer, at least one flame retardant, at least one chain extender, at least one epoxy resin, at least one acrylic resin, at least one filler, and at least one pigment, or any combination thereof.

Yet another aspect of the present invention provides a method for preparing a polyurethane foam. This method comprises (pphp is parts by weight per hundred weight parts of the polyol formulation):
(a) forming a premix comprising:
  (i) a polyol formulation comprising a polymeric polyol composition;
  (ii) about 0.5 to about 50 pphp blowing agent;
  (iii) zero to about 20 pphp water;
  (iv) about 0.05 to about 10 pphp crosslinker;
  (v) about 0.5 to about 10 pphp silicon surfactant;
  (vi) zero to about 50 pphp flame retardant;
  (vii) zero to about 20 pphp of a gelling catalyst or a blowing catalyst, or a combination thereof; and
(b) contacting the premix with at least one polyisocyanate at an Isocyanate Index from about 40 to about 800.

In this aspect, the polymeric polyol composition comprises a reaction product of:
(a) a polymeric amine composition comprising amine compounds having the formula:

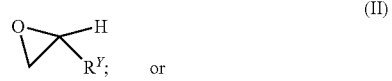
(I)

wherein:
each $R^A$ independently is a $C_1$-$C_6$ linear or branched alkyl;
each $R^B$ independently is a $C_3$-$C_6$ linear or branched alkanediyl;
each X independently is a hydrogen atom or $R^C$—$NH_2$;
$R^C$ is a $C_3$-$C_6$ linear or branched alkanediyl;
n is an integer in a range from 0 to 10; and
the polymeric amine composition has a number-average molecular weight (Mn) from about 250 to about 1500; and (b) at least one epoxide compound having the formula:

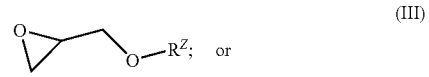
(II)

at least one glycidyl ether compound having the formula:

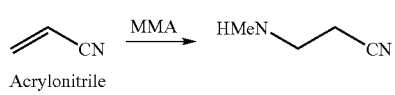
(III)

a combination thereof;
wherein:
$R^Y$ is hydrogen, phenyl, cyclohexyl, or a $C_1$-$C_{18}$ linear or branched alkyl;
$R^Z$ is hydrogen, phenyl, a $C_1$-$C_6$ linear or branched alkyl-substituted phenyl, or a $C_1$-$C_{18}$ linear or branched alkyl.

Articles of manufacture can be produced which comprise PUR foam prepared in accordance with the methods disclosed herein.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one or ordinary skill in the art without departing from the spirit of the present invention or the scope of the appended claims.

Example 1

Synthesis of a Polymeric Amine Composition Utilizing Acrylonitrile and Methylamine as Initial Reactants The first step in the synthesis (Step A, described above) is illustrated by the following reaction scheme. The first primary amine is methylamine (MMA, $MeNH_2$) and the α,β-unsaturated ketone, aldehyde, or first nitrile is acrylonitrile.

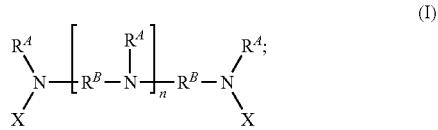

329 g (6.2 moles) of acrylonitrile and 10 g of water were placed in a 1-liter stainless-steel batch pressure reactor equipped with a stirrer. The reactor was sealed and subsequently purged with nitrogen to remove air from the reactor. While stirring the reactor contents, 232 g (7.5 moles) of methylamine were added to the reactor over a time period of 4 hours. During the addition of the methylamine, the reactor temperature was maintained in the range of 55-60° C. This temperature range was then maintained for 1.5 hours after the methylamine addition was complete. The reactor was cooled and the intermediate product, $HMeN(CH_2)_2CN$, was removed.

Step B is illustrated by the following reaction scheme, where methylamine is the second primary amine:

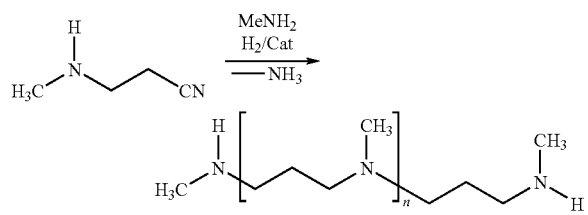

100 g of isopropanol and 5.6 g of a 5% Pd/Al$_2$O$_3$ catalyst were placed in a 1-liter stainless-steel batch pressure reactor equipped with a stirrer and 1-liter hydrogen ballast tank. The Pd/Al$_2$O$_3$ catalyst is commercially available from the Johnson-Mathey Corporation as Standard Grade powder. Alternatively, a 5% Pd/C catalyst can be used in place of the 5% Pd/Al$_2$O$_3$ catalyst. The reactor was sealed and subsequently purged with nitrogen and hydrogen to remove air from the reactor. While stirring the reactor contents, 100 g of anhydrous methylamine were added to the reactor. The reactor was then pressurized with hydrogen to 5.5 MPa (800 psi), and heated to 120° C. Over a 5-hour period, 375 g of the intermediate product described above were added to the reactor. Substantially constant reactor conditions were maintained for 2 hours after the addition of the intermediate product was complete, at which time the rate of hydrogen uptake from the ballast tank fell below 0.0034 MPa/min (about 0.5 psi/min). The reactor was cooled to room temperature and depressurized, and the reaction product was filtered to remove the catalyst. The solvent was then removed by rotary evaporation. The resulting reaction product was a secondary diamine polymer, methylamine-terminated poly-(N-methylazetidine). The Mn was determined to be approximately 194 using the GC technique disclosed in U.S. Patent Publication No. 2008-0194776, published on Aug. 14, 2008. Methylamine-terminated poly-(N-methylazetidine) has the following chemical structure:

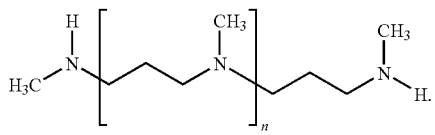

The methylamine-terminated poly-(N-methylazetidine) compound of Example 1 was analyzed using GC and had the following polymer distribution by area percent, with "others" representing reaction by-products which were not separated or identified using GC, nor used in determining Mn:

| | |
|---|---|
| n = 0 | 14% |
| n = 1 | 26% |
| n = 2 | 21% |
| n = 3 | 15% |
| n = 4 | 7% |
| n = 5 | 4% |
| Others | 13% |

Steps C and D in the synthesis are illustrated by the following reaction scheme using the secondary diamine polymer produced above as the starting material. Step C reacts the secondary diamine polymer with an α,β-unsaturated second nitrile (acrylonitrile) to form bis-cyanoethylated compounds. Step D is a hydrogenation reaction of the bis-cyanoethylated product to form a polymeric amine composition.

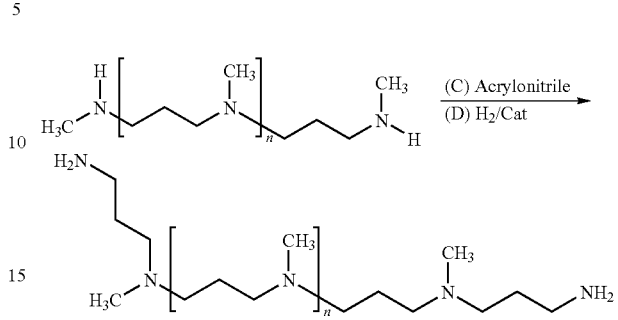

In Step C, 300 g of the secondary diamine polymer produced in Step B and 7.5 g of water were placed in a 1-liter stainless-steel batch pressure reactor equipped with a stirrer. The reactor was sealed and subsequently purged with nitrogen to remove any air from the reactor. While stirring the reactor contents, 68 g of acrylonitrile were added to the reactor over a period of 4 hours. During the addition of the acrylonitrile, the reactor temperature was maintained in a range of 55-60° C. This temperature range was then maintained for 1.5 hours after the acrylonitrile addition was complete. The reactor was cooled and the bis-cyanoethylated product removed.

Step D is the hydrogenation reaction referred to above. 125 g of isopropanol and 5 g of a Raney Cobalt catalyst were placed in a 1-liter stainless-steel batch pressure reactor equipped with a stirrer and 1-liter hydrogen ballast tank. The Raney Cobalt catalyst is commercially available from Grace as a promoted grade containing 0.5-5% chromium (promoted), 78-96% cobalt, and 0.5-5% nickel. The reactor was sealed and subsequently purged with nitrogen and hydrogen to remove air from the reactor. The reactor was then pressurized with hydrogen to 5.5 MPa (800 psi), and heated to 120° C. Over a period of 4 hours, 330 g of the bis-cyanoethylated product of Step C were added to the stirred reactor. Substantially constant reactor conditions were maintained for approximately 2 more hours after the addition of the bis-cyanoethylated product was complete, at which time the rate of hydrogen uptake from the ballast tank fell below 0.0034 MPa/min (about 0.5 psi/min). The reactor was cooled to room temperature and depressurized, and the reaction product was filtered to remove the catalyst. The solvent was then removed by rotary evaporation.

The resulting polymeric amine composition comprised primary amine compounds having the following structure:

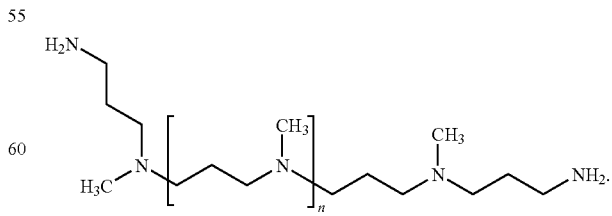

With the distribution of "n" shown above, the polymeric amine composition of Example 1 had a Mn of approximately 350. The AHEW was approximately 90.

Inventive Example 2

Synthesis of a Polyoxypropylene-Polyoxyethylene Polyol Using an Alkoxide Catalyst and the Polymeric Amine Composition of Example 1

Approximately 350 g (1 mole) of the polymeric amine composition of Example 1 were heated to approximately 110° C. under a nitrogen atmosphere in a stirred autoclave reactor. Over a 1-hour period, 232 g (4 moles) of propylene oxide were added to the reactor. After the primary amine groups in the polymeric amine composition reacted, about 0.28% (based on total batch weight) of a 45 weight percent aqueous potassium hydroxide solution was added to the reactor, and the resultant alkoxide was formed under vacuum (at a pressure of approximately 1 mbar) at about 110° C. for approximately 2 hours.

Approximately 696 g (12 moles) of propylene oxide were then added to the reactor at 145° C. over the course of 3 hours at substantially constant temperature. Following the complete addition of the propylene oxide, the reaction was allowed to continue for another hour, i.e., sufficient time for the reaction to reach completion. Then, the reaction mixture was degassed for about 15 minutes at about 105° C. under pressure of about 1 mbar to remove any remaining propylene oxide. Next, the stirred autoclave reactor was filled with nitrogen to a pressure of about 2.5 bar and about 352 g (8 moles) of ethylene oxide were added to the reactor over a time period of about 2 hours, while maintaining the reactor temperature at about 145° C. Following the complete addition of the ethylene oxide, the reaction was allowed to continue for another hour, i.e., sufficient time for the reaction to reach completion. Then, the reaction mixture was degassed for about 15 minutes at about 145° C. under pressure of about 1 mbar in order to remove any remaining ethylene oxide.

The reaction product was treated with cartridge grade Magnesol (magnesium silicate) at a use rate of seven times the charge of the base in combination with water at twice the base charge. After this base removal, the solids were removed by pressure filtration. The remaining water was removed by vacuum distillation at about 100° C. and 1 mbar pressure over a time period of about 2 hours.

The resulting reaction product was a polymeric polyoxypropylene-polyoxyethylene polyol composition. This composition had a Mw of 2320; an amine value of 218 mg KOH/g (theoretical amine value, TAV=219); a PO:EO ratio, by TAV, of 16:8; a color of 7 on the Gardner scale; and 0.9% residual water (less than 1% residual water). In the tables that follow, this polymeric polyol composition of Inventive Example 2 is designated as EX-2.

Comparative Example 3

Synthesis of a Polyoxypropylene-Polyoxyethylene Polyol Using an Alkoxide Catalyst and N,N-bis-(aminopropyl)-N-methyl amine Approximately 145 g (1 mole) of N,N-bis-(aminopropyl)-N-methyl amine were heated to approximately 110° C. under a nitrogen atmosphere in a stirred autoclave reactor. N,N-bis-(aminopropyl)-N-methyl amine has the following chemical structure:

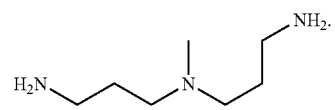

Over a 1-hour period, 232 g (4 moles) of propylene oxide were added to the reactor. After the primary amine groups in N,N-bis-(aminopropyl)-N-methyl amine reacted, about 0.28% (based on total batch weight) of a 45 weight percent aqueous potassium hydroxide solution was added to the reactor, and the resultant alkoxide was formed was formed under vacuum (at a pressure of approximately 1 mbar) at about 110° C. for approximately 2 hours.

Approximately 696 g (12 moles) of propylene oxide were then added to the reactor at 110° C. over the course of 3 hours at substantially constant temperature. Following the complete addition of the propylene oxide, the reaction was allowed to continue for another hour, i.e., sufficient time for the reaction to reach completion. Then, the reaction mixture was degassed for about 15 minutes at about 110° C. under pressure of about 1 mbar to remove any remaining propylene oxide. Next, the stirred autoclave reactor was filled with nitrogen to a pressure of about 2.5 bar and about 352 g (8 moles) of ethylene oxide were added to the reactor over a time period of about 2 hours, while maintaining the reactor temperature at about 145° C. Following the complete addition of the ethylene oxide, the reaction was allowed to continue for another hour, i.e., sufficient time for the reaction to reach completion. Then, the reaction mixture was degassed for about 15 minutes at about 145° C. under pressure of about 1 mbar in order to remove any remaining ethylene oxide.

The reaction product was treated with cartridge grade Magnesol (magnesium silicate) at a use rate of seven times the charge of the base in combination with water at twice the base charge. After this base removal, the solids were removed by pressure filtration. The remaining water was removed by vacuum distillation at about 100° C. and 1 mbar pressure over a time period of about 2 hours.

The resulting reaction product was a polyol composition. This composition had a Mw of 2100; an amine value of 112 mg KOH/g (TAV=118); a PO:EO ratio, by TAV, of 16:9.7; a color of 4 on the Gardner scale; and 0.15% residual water (less than 1% residual water). In the tables that follow, this polyol composition of Comparative Example 3 is designated as EX-3.

Constructive Example 4

Constructive Synthesis of a Polyoxypropylene Polyol Using an Alkoxide Catalyst

Constructive Example 4 substantially employs the procedures detailed in Example 2, with the exception that the step of adding ethylene oxide is omitted. The polymeric polyol composition is a polyoxypropylene polyol.

The molecular weight, amine value, PO:EO ratio, Gardner color, and residual water content for the resultant polymeric polyol composition then can be determined by the techniques employed in Example 2. Following the procedure of Example 2, it is expected that the polymeric polyol composition will have a Mw of about 1300, and contain less than 1 weight percent residual water.

Constructive Example 5

Constructive Synthesis of a Polyoxyethylene Polyol Using an Alkoxide Catalyst Constructive Example 5 substantially employs the procedures detailed in Example 2, with the exception that the step of adding propylene oxide after the introduction of potassium hydroxide is omitted. The reactor is degassed prior to the introduction of the ethylene oxide. The polymeric polyol composition is a polyoxyethylene polyol.

The molecular weight, amine value, PO:EO ratio, Gardner color, and residual water content for the resultant polymeric polyol composition then can be determined by the techniques employed in Example 2. Following the procedure of Example 2, it is expected that the polymeric polyol composition will have a Mw of about 950, and contain less than 1 weight percent residual water.

Constructive Example 6

Constructive Synthesis of a Polyol Using an Epoxy Resin

Approximately 100 g (about 0.28 moles) of the polymeric amine composition of Example 1 and about 243 g (about 0.75 moles of epoxide groups) of Dow epoxy grade D.E.R. 732 are charged to a reaction vessel at about 60° C. D.E.R. 732 is commercially available from the Dow Chemical Company and has an epoxide equivalent weight of 305-355 and a viscosity at 25° C. of 55-100 cps. This reaction proceeds for about 3 hours at an approximately constant temperature. Over the course of about 4 hours, approximately 230 g (0.7 moles of epoxide groups) of D.E.R. 732 is added dropwise to the reaction mixture, and the reactor temperature is maintained in a range of about 60° C. to about 80° C. Reactor temperature is then maintained at about 60° C. for about 10 hours.

The resultant product is a polymeric polyol composition. It is expected that this composition will have an amine value of about 38 mg KOH/g sample. The molecular weight, PO:EO ratio, Gardner color, and residual water content for the resultant polymeric polyol composition then can be determined by the techniques employed in Example 2.

Constructive Example 7

Constructive Synthesis of a Polyoxypropylene Polyol Using a Double Metal Cyanide Catalyst Approximately 150 g of the polymeric amine composition of Example 1 are heated to approximately 105° C. under a nitrogen atmosphere in a stirred autoclave reactor and reacted with about 14 g of propylene oxide. After the primary amine groups in the polymeric amine composition have reacted, about 1 g of zinc hexacyanocobaltate catalyst is added to the reactor. The reaction mixture then is stirred and heated to 105° C., followed by stripping under vacuum to remove residual water. About 25 g of propylene oxide is then added to the reactor at a pressure of about 30 in Hg. The reactor pressure is monitored until an accelerated pressure drop occurs, indicating that the catalyst is activated. Once this occurs, approximately 1350 g of propylene oxide is added slowly over a period of about three hours while maintaining the reaction pressure less than about 40 psig. After propylene oxide addition is complete, the reaction mixture is maintained at about 105° C. until a constant pressure is reached.

Volatile species are removed under vacuum, followed by filtration at about 100° C. through a filter cartridge (typically, 0.45 to 1.2 microns) to remove spent catalyst. The molecular weight, amine value, PO:EO ratio, Gardner color, and residual water content for the resultant polymeric polyol composition then can be determined by the techniques employed in Example 2.

Examples 8-12

Production of Flexible Polyurethane Foam Using the Autocatalytic Polyol Compositions of Examples 2 and 3

The formulations for Comparative Examples 8-11 and Inventive Example 12 are listed in Table 1. The autocatalytic polyol utilized in Examples 9-11 was EX-3. The autocatalytic polymeric polyol composition utilized in Example 12 was EX-2. Hence, Examples 9-12 did not employ a gelling catalyst. Comparative Example 8 was a control sample, since it did not contain an autocatalytic polyol.

TABLE 1

Flexible molded foam formulations of Examples 8-12 in pphp.

| Component | Ex 8 | Ex 9 | Ex 10 | Ex 11 | Ex 12 |
|---|---|---|---|---|---|
| Polyol | 55 | 55 | 55 | 45 | 55 |
| Polymer Polyol | 45 | 43 | 41 | 39 | 43 |
| Autocatalytic Polyol | 0 | 2 EX-3 | 4 EX-3 | 6 EX-3 | 2 EX-2 |
| Water | 3 | 3 | 3 | 3 | 3 |
| Surfactant | 0.6 | 0.6 | 0.6 | 0.6 | 0.6 |
| Gelling Catalyst | 0.7 | 0 | 0 | 0 | 0 |
| Blowing Catalyst | 0.17 | 0.17 | 0.17 | 0.17 | 0.17 |
| Crosslinker | 0.7 | 0.7 | 0.7 | 0.7 | 0.7 |
| Isocyanate Index | 100 | 100 | 100 | 100 | 100 |
| String Gel Time | 62 | 97 | 78 | 69 | 60 |

Notes on Table 1:
The polyol was SPECFLEX ® NC 630, Mw of about 5500, commercially available from the Dow Chemical Company.
The polymer polyol was a grafted polyether polyol containing copolymerized styrene and acrylonitrile, SPECFLEX ® NC 700, Mw of about 4800, commercially available from the Dow Chemical Company.
The silicone surfactant was DABCO ® DC6070, commercially available from Air Products and Chemicals, Inc.
The gelling catalyst was DABCO ® NE1070, commercially available from Air Products and Chemicals, Inc.
The blowing catalyst was DABCO ® NE300, commercially available from Air Products and Chemicals, Inc.
The crosslinker was diethanolamine.

Flexible foam was prepared by combining a total weight of 300 g of the ingredients in Table 1 other than the isocyanate in a 32-oz (951 ml) paper cup. This premix formulation was then mixed for 10 seconds at 6,000 rpm using an overhead stirrer fitted with a 2-inch (5.1 cm) diameter stirring paddle. Sufficient toluene diisocyanate was then added to achieve the desired Isocyanate Index of 100, and the formulation was mixed well for another 6 seconds at 6,000 rpm using the same stirrer. Foaming performance was evaluated by measuring the string gel time (in seconds) of the free rise foams of Comparative Examples 8-11 and Inventive Example 12. String gel time was measured manually with a wooden stick (e.g., tongue depressor or popsicle stick) and a chronometer.

As shown by Comparative Example 11 in Table 1, over 6 pphp of the autocatalytic polyol EX-3, containing only one tertiary amine group, was required to replace the gelling catalyst in Comparative Example 8 and provide similar string gel times. In contrast, the string gel time for Inventive Example 12 was 60 seconds, less than that of Comparative Example 8, and only 2 pphp of the autocatalytic polymeric polyol composition was employed. These results indicate that EX-2, containing multiple tertiary amine groups, was significantly more effective than EX-3, containing only one tertiary amine group, in replacing the gelling catalyst in a flexible foam formulation.

Examples 13-15

Production of Flexible Slabstock Polyurethane Foam Using the Autocatalytic Polyol Compositions of Examples 2 and 3

The formulations for Comparative Examples 13-14 and Inventive Example 15 are listed in Table 2. The autocatalytic polyol utilized in Example 14 was EX-3. The autocatalytic polymeric polyol composition utilized in Example 15 was EX-2. Hence, Examples 14-15 employed a reduced level of gelling catalyst. Comparative Example 13 was a control sample, since it did not contain an autocatalytic polyol.

TABLE 2

Flexible slabstock foam formulations of Examples 13-15 in pphp.

| Component | Example 13 | Example 14 | Example 15 |
|---|---|---|---|
| Polyol | 100 | 100 | 100 |
| Autocatalytic Polyol | 0 | 0.27 EX-3 | 0.18 EX-2 |
| Water | 5.4 | 5.4 | 5.4 |
| Surfactant | 1.75 | 1.75 | 1.75 |
| DABCO ® 33LV | 0.036 | 0 | 0 |
| DABCO ® T9 | 0.16 | 0.16 | 0.16 |
| Blowing Catalyst | 0.17 | 0.17 | 0.17 |
| Methylene Chloride | 10 | 10 | 10 |
| Isocyanate Index | 100 | 100 | 100 |

Notes on Table 2:
The polyol was a polyether polyol, VORANOL V235-056, commercially available from the Dow Chemical Company.
The silicone surfactant was DABCO ® DC 5943, commercially available from Air Products and Chemicals, Inc.
The gelling catalysts were DABCO ® 33LV (33% triethylenediamine in dipropyleneglycol) and DABCO ® T9 (stannous octoate), both commercially available from Air Products and Chemicals, Inc.
The blowing catalyst was DABCO ® BL11 (70% solution of bis(dimethylaminoethyl)ether in dipropylene glycol), commercially available from Air Products and Chemicals, Inc.

FIG. 1 is a plot of the foam height versus time for Example 13 and Example 15. As illustrated in FIG. 1, the rate of foam rise when using the EX-2 autocatalytic polymeric polyol composition, as in Example 15, was almost identical to that of a standard foam formulation, as in Example 13. Example 13 used an amine gelling catalyst, while Example 15 contained no amine gelling catalyst.

Example 14 provided a similar rate of rise profile to that of Example 15. As demonstrated in Table 2, however, 50% more autocatalytic polyol was required for Example 14 than for Example 15.

Examples 16-21

Production of Rigid Polyurethane Foam Using the Autocatalytic Polyol Compositions of Examples 2 and 3

The formulations for Comparative Examples 16 and 21 and Inventive Examples 17-20 are listed in Table 3. The autocatalytic polyol utilized in Example 21 was EX-3. The autocatalytic polymeric polyol composition utilized in Examples 17-20 was EX-2. Hence, Examples 17-21 did not employ a gelling catalyst. Comparative Example 16 was a control sample, since it did not contain an autocatalytic polyol.

TABLE 3

Rigid foam formulations of Examples 16-21 in pphp.

| Component | Ex 16 | Ex 17 | Ex 18 | Ex 19 | Ex 20 | Ex 21 |
|---|---|---|---|---|---|---|
| Polyol | 100 | 95.5 | 91 | 80 | 85 | 85 |
| Autocatalytic Polyol | 0 | 4.5 | 9 | 20 | 15 | 15 |
| | | EX-2 | EX-2 | EX-2 | EX-2 | EX-3 |
| Gelling Catalyst | 1.6 | 0 | 0 | 0 | 0 | 0 |
| Flame Retardant | 20 | 20 | 20 | 20 | 20 | 20 |
| Water | 2 | 2 | 2 | 2 | 2 | 2 |
| Surfactant | 2 | 2 | 2 | 2 | 2 | 2 |
| n-Pentane | 11 | 11 | 11 | 11 | 11 | 11 |
| Isocyanate Index | 120 | 120 | 120 | 120 | 120 | 120 |
| String Gel Time | 98 | 259 | 167 | 78 | 100 | 288 |

Notes on Table 3:
The polyol was a polyether polyol, PLURACOL ® SG360, commercially available from BASF.
The silicone surfactant was DABCO ® DC 5598, commercially available from Air Products and Chemicals, Inc.
The gelling catalyst was POLYCAT ® 9, commercially available from Air Products and Chemicals, Inc.
The flame retardant was TCPP.

As shown by Example 20 in Table 3, approximately 15 pphp of the autocatalytic polymeric polyol composition, EX-2, was able to replace the gelling catalyst in a foam formulation (see Example 16) and obtain the same string gel time of about 100 seconds.

Comparative Example 21 utilized 15 pphp of autocatalytic polyol EX-3 and the string gel time was 288 seconds. In contrast, Example 20 utilized 15 pphp of autocatalytic polymeric polyol composition EX-2 and the string gel time was 100 seconds. Hence, the multiple tertiary amine groups present in EX-2 resulted in a much more efficient gelling autocatalytic polyol over that of EX-3, which contained only one tertiary amine.

The invention claimed is:

1. A polymeric polyol composition comprising a contact product of:

(a) a polymeric amine composition comprising amine compounds having the formula:

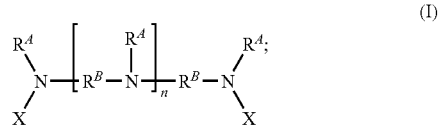

(I)

wherein:

each $R^A$ is methyl each $R^B$ is a $C_3$ linear alkanediyl;

each X is $R^C$—$NH_2$;

$R^C$ is a $C_3$ linear alkanediyl;

n is an integer in a range from 0 to 10; and the polymeric amine composition has a number-average molecular weight (Mn) from about 250 to about 1500; and (b) at least one epoxide compound having the formula:

(II)

or at least one glycidyl ether compound having the formula:

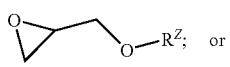 (III)

a combination thereof;
wherein:
R$^Y$ is hydrogen, phenyl, cyclohexyl, or a C$_1$-C$_{18}$ linear or branched alkyl;
R$^Z$ is hydrogen, phenyl, a C$_1$-C$_6$ linear or branched alkyl-substituted phenyl, or a C$_1$-C$_{18}$ linear or branched alkyl.

2. The composition of claim 1, wherein R$^Y$ is hydrogen, methyl, or phenyl.

3. The composition of claim 1, wherein R$^Z$ is methyl, ethyl, propyl, butyl, hexyl, 2-ethylhexyl, octyl, decyl, dodecyl, tetradecyl, hexadecyl, octadecyl, phenyl, or butyl-substituted phenyl.

4. The composition of claim 1, wherein the polymeric amine composition has a number-average molecular weight (Mn) from about 300 to about 800.

5. The composition of claim 1, wherein the polymeric polyol composition has a weight-average molecular weight (Mw) from about 400 to about 20,000.

6. The composition of claim 1, wherein the polymeric polyol composition has a weight-average molecular weight (Mw) from about 1,000 to about 5,000.

7. The composition of claim 1, wherein the polymeric polyol composition has a hydroxyl number from about 5 to about 600 mg KOH/g.

8. The composition of claim 1, wherein the polymeric polyol composition has an amine value from about 10 to about 800 mg KOH/g.

9. The composition of claim 1, wherein the polymeric polyol composition has a hydroxyl equivalent weight (EW) from about 100 to about 10,000.

10. The composition of claim 1, wherein the polymeric amine composition and the at least one epoxide compound or at least one glycidyl ether compound, or a combination thereof, are reacted in the presence of a catalyst.

11. A polyol formulation comprising a contact product of:
(i) polymeric polyol composition of claim 1; and
(ii) at least one second polyol, wherein the at least one second polyol is at least one polyether polyol, at least one polyester polyol, or at least one polymer polyol, or any combination thereof.

12. The polyol formulation of claim 11, wherein a weight ratio of the polymeric polyol composition to the at least one second polyol is in a range from about 10:1 to about 1:1,000.

13. A method of making a polyurethane comprising contacting at least one polyisocyanate with the polyol formulation of claim 11 in the presence of a catalytically effective amount of a catalyst composition under conditions sufficient to produce the polyurethane.

14. The method of claim 13, wherein the catalyst composition is present in an amount from about 0.01 to about 20 parts by weight per hundred weight parts of the polyol formulation (pphp).

15. The method of claim 13, wherein the contacting of the at least one polyisocyanate and the polyol formulation occurs in the presence of at least one blowing agent under conditions sufficient to produce a polyurethane foam.

16. The method of claim 15, wherein the at least one blowing agent is water, methylene chloride, acetone, a chlorofluorocarbon, a hydrofluorocarbon, a hydrochlorofluorocarbon, or a hydrocarbon, or any combination thereof.

17. The method of claim 15, wherein the polyurethane foam is substantially free of volatile amines and/or amine odors.

18. The method of claim 15, wherein the contacting of the at least one polyisocyanate and the polyol formulation occurs in the presence of at least one additive, wherein the at least one additive is at least one crosslinker, at least one cell stabilizer, at least one flame retardant, at least one chain extender, at least one epoxy resin, at least one acrylic resin, at least one filler, or at least one pigment, or any combination thereof.

19. A composition comprising a contact product of:
(i) at least one polyisocyanate; and
(ii) a polyol formulation comprising a polymeric polyol composition, wherein the polymeric polyol composition comprises a contact product of:
(a) a polymeric amine composition comprising amine compounds having the formula:

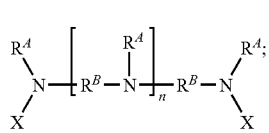 (I)

wherein:
each R$^A$ is methyl;
each R$^B$ is a C$_3$ linear alkanediyl;
each X is a R$^C$—NH$_2$;
R$^C$ is a C$_3$ linear alkanediyl;
n is an integer in a range from 0 to 10; and
the polymeric amine composition has a number-average molecular weight (Mn) from about 250 to about 1500; and
(b) at least one epoxide compound having the formula:

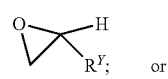 (II)

at least one glycidyl ether compound having the formula:

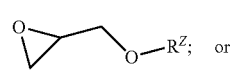 (III)

a combination thereof;
wherein:
R$^Y$ is hydrogen, phenyl, cyclohexyl, or a C$_1$-C$_{18}$ linear or branched alkyl;
R$^Z$ is hydrogen, phenyl, a C$_1$-C$_6$ linear or branched alkyl-substituted phenyl, or a C$_1$-C$_{18}$ linear or branched alkyl.

20. The composition of claim 19, wherein the at least one polyisocyanate comprises hexamethylene diisocyanate, isophorone diisocyanate, diphenyl methane diisocyanate, toluene diisocyanate, prepolymers of isocyanates or a combination thereof.

21. The composition of claim 19, wherein the polyol formulation further comprises at least one second polyol, and wherein the at least one second polyol is at least one polyether polyol, at least one polyester polyol, or at least one polymer polyol, or any combination thereof.

22. The composition of claim 19, further comprising at least one urethane catalyst, wherein the least one urethane catalyst is at least one gelling urethane catalyst or at least one blowing urethane catalyst, or a combination thereof.

23. The composition of claim 19, further comprising at least one additive, wherein the at least one additive is at least one crosslinker, at least one cell stabilizer, at least one flame retardant, at least one chain extender, at least one epoxy resin, at least one acrylic resin, at least one filler, or at least one pigment, or any combination thereof.

24. A method for preparing a polyurethane foam comprising:
  (A) forming a premix comprising:
    (i) a polyol formulation comprising an autocatalytic polymeric polyol composition;
    (ii) about 0.5 to about 50 pphp blowing agent;
    (iii) zero to about 20 pphp water;
    (iv) about 0.05 to about 10 pphp crosslinker;
    (v) about 0.5 to about 10 pphp silicon surfactant;
    (vi) zero to about 50 pphp flame retardant;
    (vii) zero to about 20 pphp of a gelling catalyst or a blowing catalyst, or a combination thereof;
  wherein the polymeric polyol composition comprises a contact product of:
    (a) a polymeric amine composition comprising amine compounds having the formula:

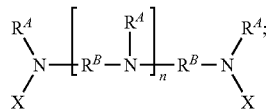
(I)

wherein:
each $R^A$ is methyl;
each $R^B$ is a $C_3$ linear alkanediyl;
each X is a $R^C$—$NH_2$;
$R^C$ is a $C_3$ linear alkanediyl;
n is an integer in a range from 0 to 10; and
the polymeric amine composition has a number-average molecular weight (Mn) from about 250 to about 1500; and
    (b) at least one epoxide compound having the formula:

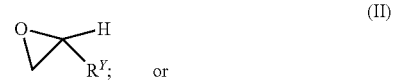
(II)

or at least one glycidyl ether compound having the formula:

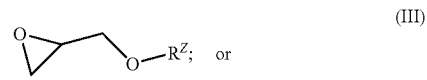
(III)

or a combination thereof;
  wherein:
    $R^Y$ is hydrogen, phenyl, cyclohexyl, or a $C_1$-$C_{18}$ linear or branched alkyl;
    $R^Z$ is hydrogen, phenyl, a $C_1$-$C_6$ linear or branched alkyl-substituted phenyl, or a $C_1$-$C_{18}$ linear or branched alkyl; and
  (B) contacting the premix with at least one polyisocyanate at an Isocyanate Index from about 40 to about 800.

25. An article of manufacture comprising the polyurethane foam prepared by the method of claim 24.

26. The article of manufacture of claim 25 wherein the foam has a density of about 20 to about 250 Kg/m$^3$.

27. The article of manufacture of claim 25 wherein the foam has thermal stability up to about 150 C.

28. The composition of claim 1 further comprising at least one second polyol.

* * * * *